(12) United States Patent
Yamada et al.

(10) Patent No.: US 7,813,245 B2
(45) Date of Patent: Oct. 12, 2010

(54) OPTICAL DISK IMAGE FORMING DEVICE, OPTICAL DISK IMAGE FORMING METHOD AND OPTICAL DISK

(75) Inventors: Seiya Yamada, Hamamatsu (JP); Hisanori Itoga, Hamamatsu (JP); Tatsuo Fushiki, Hamamatsu (JP); Hiroshi Kubo, Odawara (JP); Michihiro Shibata, Odawara (JP)

(73) Assignees: Yamaha Corporation, Hamamatsu-shi (JP); Fujifilm Corporation, Tokyo (JP)

( * ) Notice: Subject to any disclaimer, the term of this patent is extended or adjusted under 35 U.S.C. 154(b) by 331 days.

(21) Appl. No.: 11/909,891

(22) PCT Filed: Sep. 29, 2006

(86) PCT No.: PCT/JP2006/319584

§ 371 (c)(1), (2), (4) Date: Sep. 27, 2007

(87) PCT Pub. No.: WO2007/037436

PCT Pub. Date: Apr. 5, 2007

(65) Prior Publication Data

US 2009/0147631 A1 Jun. 11, 2009

(30) Foreign Application Priority Data

Sep. 30, 2005 (JP) .............................. 2005-288742

(51) Int. Cl.
*G11B 15/04* (2006.01)
(52) U.S. Cl. ................................. 369/53.22; 369/53.25
(58) Field of Classification Search ........................ None
See application file for complete search history.

(56) References Cited

U.S. PATENT DOCUMENTS

| 2005/0265213 A1 | 12/2005 | Matsuishi et al. |
| 2005/0281536 A1 | 12/2005 | Aiso et al. |
| 2009/0129231 A1 | 5/2009 | Shibata et al. |

FOREIGN PATENT DOCUMENTS

EP      1 308 938 A2      5/2003

(Continued)

OTHER PUBLICATIONS

International Search Report dated Oct. 31, 2006 (One (1) page).

(Continued)

*Primary Examiner*—Paul Huber
(74) *Attorney, Agent, or Firm*—Crowell & Moring LLP (57) ABSTRACT

When an image is formed on an optical disk, an optical disk image forming device reads information written in an information area of the optical disk. When a reflection preventing process is applied to an image forming area of the optical disk, the optical disk image forming device corrects at least one of a laser power or a focus gain in accordance with information about the image forming area written in the information area. Thus, the optical disk image forming device can form the image with a clear brightness and a good visibility on the image forming area of the optical disk without allowing a rainbow-color to appear or a face or a background to be reflected due to the interference of light.

8 Claims, 5 Drawing Sheets

FOREIGN PATENT DOCUMENTS

| | | |
|---|---|---|
| EP | 1 583 089 A1 | 10/2005 |
| JP | 2001-143327 A | 5/2001 |
| JP | 2002-97371 A | 4/2002 |
| JP | 2002-203321 A | 7/2002 |
| JP | 2002-298545 A | 10/2002 |
| JP | 2003-242669 A | 8/2003 |
| JP | 2004-22157 A | 1/2004 |
| JP | 2004-30800 A | 1/2004 |
| JP | 2004-39027 A | 2/2004 |
| JP | 2005-92099 A | 4/2005 |
| JP | 2005-182980 A | 7/2005 |
| JP | 2005-252426 A | 9/2005 |
| JP | 2005-284692 A | 10/2005 |
| JP | 2006-155751 A | 6/2006 |
| JP | 2006-230545 A | 9/2006 |
| JP | 2006-232021 A | 9/2006 |
| JP | 2006-234239 A | 9/2006 |
| JP | 2007-95269 A | 4/2007 |
| JP | 2007-95273 A | 4/2007 |
| JP | 2007-122848 A | 5/2007 |
| WO | WO 2004/064053 A1 | 7/2004 |

OTHER PUBLICATIONS

English translation of Japanese Office Action dated Jun. 10, 2009 (Eight (8) pages).

Supplementary European Search Report dated Dec. 29, 2008 (seven (7) pages).

| information of information area | | | correction parameter | |
|---|---|---|---|---|
| name of coloring matter | reflection preventing process | form and material | laser power | focus gain |
| Oxonol | mat process | circular cone | 1.20 times | 3.50 dB |
| Oxonol | mat process | square pyramid | 1.12 times | 4.00 dB |
| Oxonol | mat process | sand blast | 1.25 times | 3.00 dB |
| Oxonol | Coating | magnesium fluoride | 1.00 time | 0.50 dB |
| oxonol | Coating | silicon dioxide | 1.08 time | 2.00 dB |
| ⋮ | ⋮ | ⋮ | ⋮ | ⋮ |
| Azo | mat process | circular cone | 1.18 times | 2.50 dB |
| Azo | mat process | square pyramid | 1.11 times | 2.20 dB |
| Azo | mat process | sand blast | 1.23 times | 2.80 dB |
| Azo | Coating | magnesium fluoride | 1.04 times | 0.00 dB |
| Azo | Coating | silicon dioxide | 1.06 times | 1.50 dB |
| ⋮ | ⋮ | ⋮ | ⋮ | ⋮ |
| Cyanine | mat process | circular cone | 1.25 times | 3.00 dB |
| Cyanine | mat process | square pyramid | 1.18 times | 2.20 dB |
| Cyanine | mat process | sand blast | 1.30 times | 2.60 dB |
| Cyanine | Coating | magnesium fluoride | 1.11 times | 1.00 dB |
| Cyanine | Coating | silicon dioxide | 1.13 times | 1.20 dB |
| ⋮ | ⋮ | ⋮ | ⋮ | ⋮ |

FIG. 4

<LABEL SURFACE>

FIG. 5

OPTICAL DISK IMAGE FORMING DEVICE, OPTICAL DISK IMAGE FORMING METHOD AND OPTICAL DISK

This application is a 371 of PCT/JP2006/319584, filed Sep. 29, 2006.

TECHNICAL FIELD

The present invention relates to an optical disk image forming device, an optical disk image forming method for forming an image such as a character or a photograph on an image forming surface of an optical disk to which a reflection preventing process is applied and an optical disk used therefor.

BACKGROUND ART

The invention concerning an image forming device for forming an image such as a character or a photograph on a data recording surface or a label surface of a recording type optical disk that can record the data of a CD-R or a DVD-R and an optical disk suitable therefor has been hitherto proposed (for instance, see Patent Documents 1 and 2). This technique applies a phenomenon that colors are different between a part on which data is recorded by irradiating the data recording layer (a coloring matter layer) of the optical disk with a laser beam and a part on which the data is not recorded. This technique is used so that the image can be formed on the data recording surface of the optical disk or the label surface of the optical disk on which the coloring matter layer is formed on the label surface side of the optical disk.

However, since the optical disk is formed with a smooth and transparent base board, a problem arises that the visibility of the image formed on the optical disk is deteriorated due to unnecessary reflected light. When a track groove is formed on the data recording surface or the label surface, a rainbow-color appears on the surface due to the interference of light and a plurality of radial lines appear to deteriorate the visibility of the image. Further, in the case that the track groove is not formed on the label surface, a face or a background is reflected on the label surface as like a mirror, so that the visibility of the image is also deteriorated.

Thus, the invention concerning an optical disk with a reflection preventing layer having a micro irregular pattern formed on a disk board of an optical disk has been hitherto disclosed (for instance, see Patent Document 3). Further, the invention concerning a resin component that can efficiently form a micro irregular pattern on the disk board of an optical disk is disclosed (for instance, see Patent Documents 4 and 5). Further, the invention concerning an optical disk is disclosed in which the surface of an optical disk board is coated with a reflection preventing film (for instance, see Patent Document 6).

Patent Document 1: JP-A-2002-203321
Patent Document 2: JP-A-2004-039027
Patent Document 3: JP-A-2004-022157
Patent Document 4: JP-A-2005-092099
Patent Document 5: JP-A-2002-097371
Patent Document 6: JP-A-2001-143327

Disclosure of the Invention

Problems that the Invention is to Solve

As described above, since the reflection preventing layer is provided in the optical disk or the optical disk is coated with the reflection preventing film so that the reflection factor of a surface on which an image is formed is lowered, a rainbow-color is prevented from appearing on the surface due to the interference of light or a face or a background is prevented from being reflected on the surface. Thus, the visibility of the image can be improved. However, when the image is formed on the optical disk, a laser beam needs to penetrate the reflection preventing layer or the reflection preventing film, so that the laser beam is attenuated. Accordingly, when the image is formed with the same laser power as that when an image is formed on an ordinary optical disk to which the reflection preventing process is not applied by the usual optical disk image forming device, a problem arises that an image with a clear brightness and a good visibility cannot be formed on the label surface.

Thus, it is an object of the present invention to solve the above-described problems and to provide an optical disk image forming device and an optical disk image forming method for forming an image with a clear brightness and a good visibility on an optical disk to which a reflection preventing process is applied and an optical disk used therefor.

Means for Solving the Problems

As means for solving the above-described problems, the present invention includes below-described structures.

(1) An optical disk image forming device for forming an image on an optical disk which includes a data surface and a label surface and in which an information area and an image forming area are set, the optical image forming device comprising:

laser beam applying means for performing a focus servo and applying a laser beam to the optical disk;

information reading means for driving the laser beam applying means and reading information from the information area;

discriminating means for discriminating whether or not a reflection preventing process is applied to the image forming area in accordance with the read information; and correcting means for correcting at least one of a laser power and a focus gain in accordance with information about the image forming area including information about the reflection preventing process when the discriminating means discriminates that the reflection preventing process is applied to the image forming area, wherein when the image is formed on the image forming area to which the reflection preventing process is applied, the laser beam applying means applies the laser beam to the optical disk in accordance with at least one of the laser power and the focus gain corrected by the correcting means to form the image on the image forming area.

When the reflection preventing process is applied to the optical disk, the reflection factor of that part is lowered. Thus, a rainbow-color does not appear, nor a face or a background is reflected due the interference of light. However, when the laser beam is applied to form the image, since the attenuation factor of the laser beam is different, if the laser power or the focus gain is not set to a laser power or a focus gain different from that when the image is formed on a part to which the reflection preventing process is not applied, a focus is unstable so that a recording operation cannot be carried out by the stable irradiation of a laser and the image with a sharp brightness and a good visibility cannot be formed. In this structure, when the image is formed on the optical disk, the optical disk image forming device reads the information written in the information area. Then, when it is recorded that the reflection preventing process is applied to the image forming area of the optical disk, the optical disk image forming device corrects at least one of the laser power or the focus gain in accordance with the information about the image forming area such as the information about the reflection preventing process that is written in the information area. Accordingly, the optical disk image forming device can form the image with the sharp brightness and the good visibility in the image forming area of the optical disk to which the reflection preventing process is applied without causing the rainbow-color to appear or the face or the background to be reflected owing to the interference of light.

(2) The optical disk image forming device according to (1), wherein the laser beam applying means applies, before the image is formed, the laser beam to a servo adjusting area or the information area which is set in the optical disk and to which the reflection preventing process is not applied to adjust the laser power and the focus gain.

When the laser power or the focus gain is adjusted in the image forming area to which the reflection preventing process is applied, the level of a returning light from the optical disk may be finely varied, especially may receive no little influence of the fine adjustment of the focus gain so that a proper focus gain cannot be determined. In this structure, when the image is formed on the optical disk, the laser power or the focus gain is adjusted in the information area or the servo adjusting area to which the reflection preventing process is not applied to correct these values in accordance with the information about the image forming area such as the contents of the reflection preventing process of the optical disk recorded in the information area. Accordingly, even when there is variation in the state of the optical disk due to the difference of a producing time or a lot, the laser power or the focus gain optimum for the optical disk can be set.

(3) The optical disk image forming device according to (1) or (2) further comprising storing means for storing correction parameters of the laser power and the focus gain corresponding to the reflection preventing process, wherein the correcting means corrects at least one of the laser power or the focus gain by using the correction parameters read from the storing means.

In this structure, the optical disk image forming device reads from the storing unit the correction parameters of the laser power and the focus gain corresponding to the contents of the reflection preventing process recorded in the information area of the optical disk to correct at least one of parameters of the laser power or the focus gain. Since the optical disk image forming device corrects at least one of the correction parameters of the laser power or the focus gain in accordance with the contents of the reflection preventing process, the optical disk image forming device can sets the laser power or the focus gain suitable for the reflection preventing process applied to the image forming area of the optical disk. Accordingly, the image with the sharp brightness and the good visibility can be formed in the image forming area.

(4) The optical disk image forming device according to (1), wherein the laser power of the laser beam applied when the image is formed on the image forming area to which the reflection preventing process is applied is stronger than the laser power of the laser beam applied when the information is read from the information area.

(5) A method of forming an image on an optical disk which includes a data surface and a label surface, and in which an information area and an image forming area are set, the method comprising:

an information reading step of performing a focus servo and applying a laser beam to the optical disk to read information from the information area;

a discriminating step of discriminating whether or not a reflection preventing process is applied to the image forming area in accordance with the read information; and a correcting step of correcting at least one of a laser power and a focus gain in accordance with information about the image forming area including information about the reflection preventing process when the discriminating step discriminates that the reflection preventing process is applied to the image forming area; and an image forming step of applying the laser beam to the disk in accordance with at least one of the laser power and the focus gain corrected in the correcting step to form the image on the image forming area to which the reflection preventing process is applied.

(6) The method according to (5) further comprising an adjusting step of applying, before the image is formed in the image forming step, the laser beam to a servo adjusting area or the information area which is set in the optical disk and to which the reflection preventing process is not applied to adjust the laser power and the focus gain.

(7) The method according to (5) or (6) further comprising a step of storing correction parameters of the laser power and the focus gain corresponding to the reflection preventing process, wherein in the correcting step, at least one of the laser power or the focus gain is corrected by using the correction parameters stored in the storing step.

(8) A method according to (5), wherein the laser power of the laser beam in the image forming step is stronger than the laser power of the laser beam in the information reading step.

(9) An optical disk comprising:
a data surface;
a label surface;
an image forming area that is set in the data surface or the label surface and includes a discoloring layer on which an image is formed by applying a laser beam; and
an information area set in the data surface or the label surface, wherein in the information area, information indicating whether or not a reflection preventing process is applied to the image forming area, information showing the kind of the reflection preventing process and information showing the kind of the discoloring layer are stored.

(10) An optical disk according to (9) further comprising a servo adjusting area to which the reflection preventing process is not applied.

Advantage of the Invention

In the optical disk image forming device of the present invention, since the laser power or the focus gain is changed in accordance with the reflection preventing process provided on the label surface of the optical disk for forming the image, the image with the sharp brightness and the good visibility can be formed on the optical disk.

Further, when the laser power or the focus gain is adjusted in the image forming area to which the reflection preventing process is applied, the level of a returning light from the optical disk may be finely varied, especially may receive no little influence of the fine adjustment of the focus gain so that a desired image cannot be formed. However, in the present invention, when the image is formed on the optical disk, the laser power or the focus gain is adjusted in the information area or the servo adjusting area to which the reflection preventing process is not applied and these values are corrected in accordance with the contents of the reflection preventing process of the optical disk recorded in the information area. Accordingly, the image can be formed with the laser power or the focus gain optimum for the optical disk.

BEST MODE FOR CARRYING OUT THE INVENTION

An optical disk image forming device according to An embodiment of the present invention has an image forming function for forming an image on an optical disk and a function for forming an image on an optical disk to which a reflection preventing process is applied in addition to a function for recording information in the optical disk and a function for reading recorded information on the optical disk that are provided in an ordinary optical disk recording and reproducing device.

Firstly, the structure of the optical disk image forming device will be described. Since the function for recording the information on the data recording surface of the optical disk and the function for reading the information recorded on the data recording surface of the optical disk are a well-known technique, the detailed explanation thereof will be omitted. Further, in the following description, a case that an image is formed on an optical disk having a discoloring layer provided in the label surface side of a DVD-R is described as one example. However, the present invention is not limited thereto, and the image can be formed on other kinds of recording type optical disks. Further, an image can be formed on a part to which a reflection preventing process is applied in a optical disk to which the reflection preventing process is applied from an intermediate part to an outer peripheral side of a data recording surface.

<Structure of Optical Disk Image Forming Device>

Figure 1:
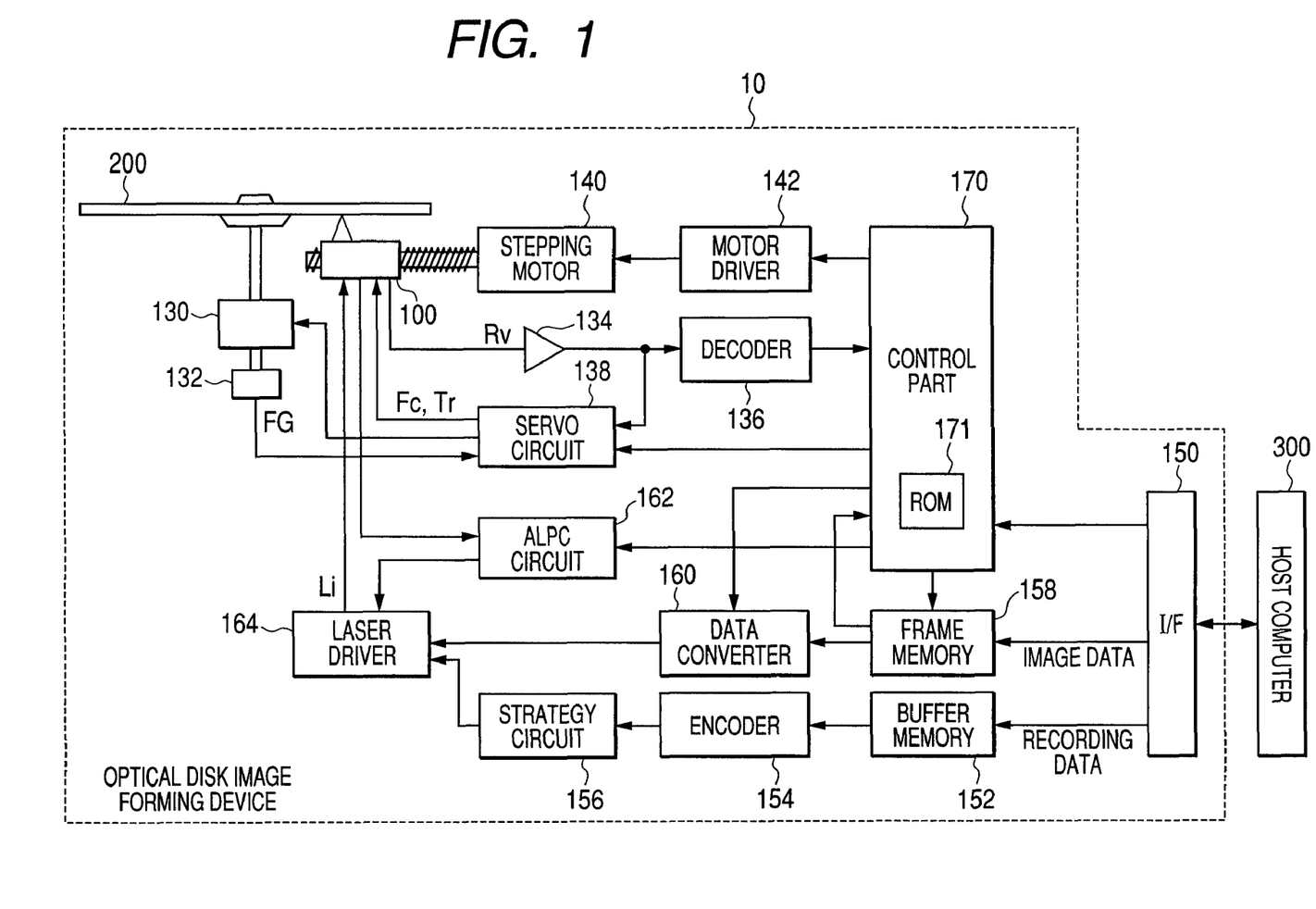
FIG. 1 is a block diagram showing a schematic structure of an optical disk image forming device according to an embodiment of the present invention.

FIG. 1 is a block diagram showing the schematic structure of the optical disk image forming device according to an embodiment of the present invention. As shown in FIG. 1, the optical disk image forming device 10 includes an optical pick-up 100, a spindle motor 130, A rotation detector 132, an RF (Radio Frequency) amplifier 134, a decoder 136, a servo circuit 138, a stepping motor 140, a motor driver 142, an interface 150, a buffer memory 152, an encoder 154, a strategy circuit 156, a frame memory 158, a data converter 160, an automatic laser power control (Automatic Laser Power Control: ALPC) circuit 162, a laser Driver 164 and a control part 170. The optical disk image forming device 10 is connected to a host computer 300 through the interface 150.

In the following description, the optical disk image forming device 10 records the information or forms the image on an optical disk 200 by a CAV (Constant Angular velocity) system. It is to be understood that the present invention may use other system such as a CLV (Constant Linear Velocity) system or a ZCLV (Zone Constant Linear velocity) system.

Further, the optical disk image forming device 10 can record (except a type exclusive for a reproduction) and reproduce data or form the image on various kinds of optical disks such as a type exclusive for reproduction, a WORM type and a rewrite type of a DVD system and a CD system.

The spindle motor 130 rotates the optical disk 200 held by a holding mechanism not shown in the drawing.

The rotation detector 132 outputs a signal FG of a frequency corresponding to the rotating speed of the spindle motor 130.

The optical pick-up 100 includes a laser diode not shown in the drawing, a plurality of lenses such as an objective lens, a tracking servo mechanism, a focus servo mechanism or the like and applies a laser beam converged by the lenses to the rotating optical disk 200.

The stepping motor 140 moves the optical pick-up 100 in the radial direction of the optical disk 200 by its rotation.

The motor driver 142 outputs a driving signal for moving the optical pick-up 100 by an amount of movement and in the direction instructed from the control part 170 to the stepping motor 140 to perform a thread control.

The RF amplifier 134 amplifies a light receiving signal Rv outputted from the optical pick-up 100 to output the amplified signal to the decoder 136 and the servo 138.

When the decoder 136 reproduces the recording surface of the optical disk 200 to read information recorded on the optical disk 200, since the light receiving signal Rv outputted from the optical pick-up 100 is modulated to 8/16, the decoder 136 demodulates the light receiving signal and outputs the demodulated signal to the control part 170.

The servo circuit 138 carries out a feedback control (a rotation control) so that the rotating speed of the spindle motor 130 detected by the signal FG reaches an angular velocity instructed from the control part 170. Further, the servo circuit 138 performs a tracking control (a tracking servo) and a focus control (a focus servo) relative to the optical pick-up 100 in addition to the rotation control.

In the control part 170, only a ROM 171 is illustrated as a detailed structure. However, the control part includes a CPU and a RAM as other members. The CPU not shown in the drawing operates respective parts in accordance with a program stored in the ROM 171 to record the information on the recording surface of the optical disk 200 or form the image on the label surface or the recording surface of the optical disk 200. As described below, when the image is formed on the optical disk 200, a signal is outputted to the servo circuit 138 or the ALPC circuit 162 on the basis of correction parameters stored in the ROM 171 to correct a laser power or a focus gain.

The interface (I/F) 150 is an interface for receiving a control signal or information supplied from the host computer 300 by the optical disk image forming device 10.

When the information to be recorded on the recording surface of the optical disk 200 (refer it to as recording data, hereinafter) is supplied from the host computer 300 through the interface 150, the buffer memory 152 Records the recording data in an FIFO (first-in first-out) form.

The encoder 154 8/16 modulates the recording data read from the buffer memory 152 and outputs the recording data to the strategy circuit 156.

The strategy circuit 156 applies a timing axis correcting process to the 8/16 modulated signal supplied from the encoder 154 to output the signal to the laser driver 164.

When the information (refer it to as image data, hereinafter) of the image to be formed on the optical disk 200 is supplied from the host computer 300 through the interface 150, the frame memory 158 accumulates the image data. This image data indicates a congregation of gradation data prescribing the density of each pixel of the image formed in the disk shaped optical disk 200.

When the image is formed on the optical disk 200, the data converter 160 converts the strength of the laser beam to a signal for instructing a light level as a strength by which a discoloring layer 204 is adequately discolored when the laser beam is applied thereto or a servo level as a strength by which the discoloring layer 204 is not discolored even when the laser beam is applied thereto, in accordance with the gradation data read from the frame memory 158 and the number of rotations instructed by the control part 170 and outputs the signal to the laser driver 164.

The ALPC circuit 162 serves to control the strength of the laser beam applied from the laser diode not shown in the drawing. Specifically, the ALPC circuit 162 controls the current value of a driving signal Li so that the value of a quantity of the output light of the laser diode not shown and detected by a front monitor diode not shown in the drawing corresponds to a target value of an optimum laser power supplied by the control part 170.

When the information is recorded, the laser driver generates the driving signal Li that represents control contents by the ALPC circuit 162 in accordance with the modulated data supplied from the strategy circuit and supplies the driving signal to the laser diode of the optical pick-up 100. Further, when the image is formed, the laser driver generates the driving signal Li that represents control contents by the ALPC circuit 162 in accordance with the data converted by the data converter 160 and supplies the driving signal to the laser diode of the optical pick-up 100. Thus, the strength of the laser beam by the laser diode is feedback controlled so as to correspond to the target value supplied from the control part 170.

(Structure of Optical Disk)

Figure 2:
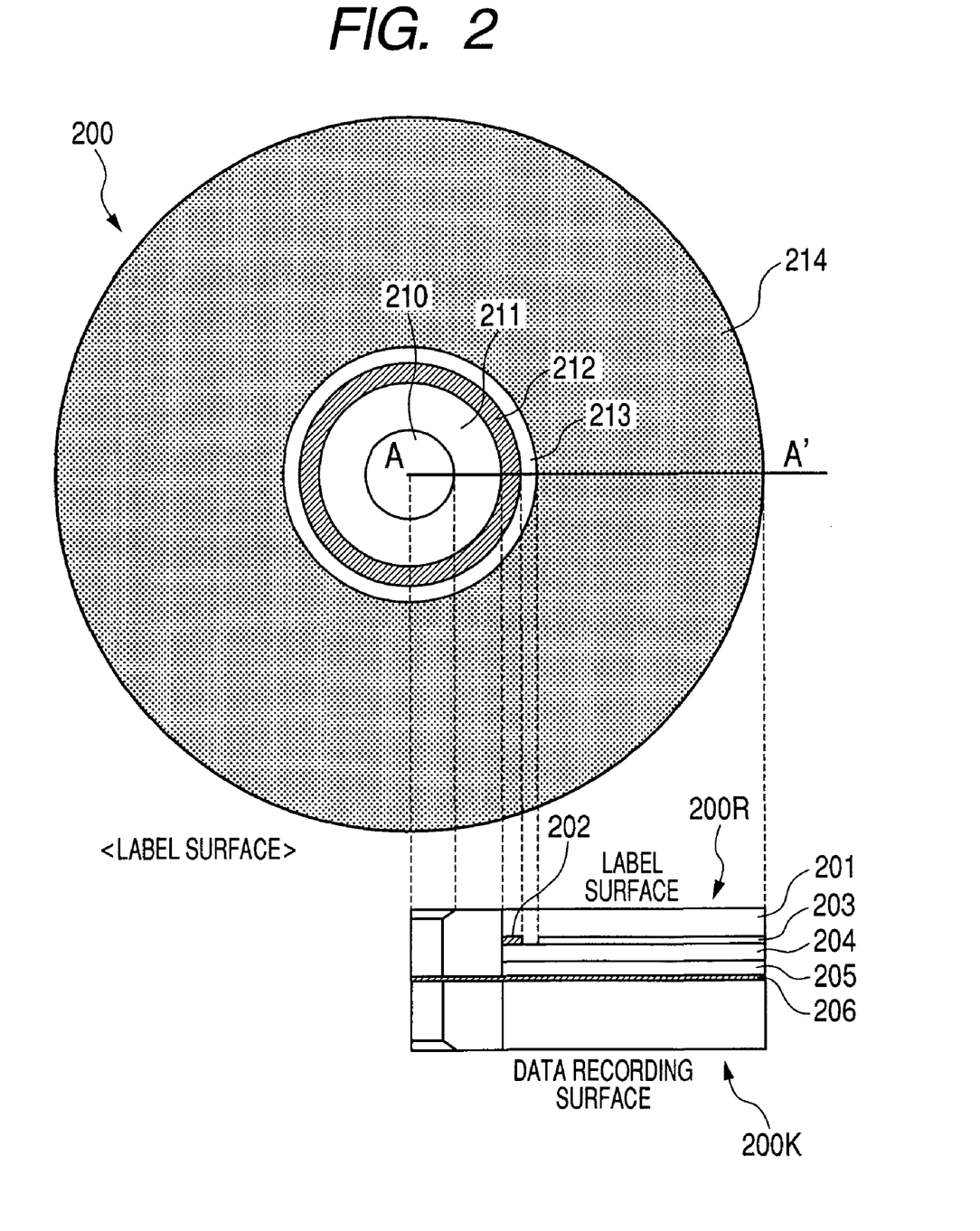
FIG. 2 is a schematic front view and a sectional view of a label surface of an optical disk that can form an image.

FIG. 2 is a schematic front surface view of the label surface of the optical disk that can form the image and a sectional view taken along A-A'. As shown in FIG. 2, the optical disk 200 is a DVD-R having a structure in which two base materials 200K and 200R are bonded together. The base material 200R of the label surface side has a structure that a protecting layer (a poly-carbonate base plate) 201, an information recording layer 202 and a reflection preventing layer 203, the discoloring layer (a coloring matter layer) 204, a reflecting layer 205 and an adhesive layer 206 are laminated in this order from the label surface side. Further, in the optical disk 200, a clamp area 211 is provided in the periphery of a center hole 210 formed at a center. Further, in the periphery thereof, an information area 212, a servo adjusting area 213 and an image forming area 214 are formed in order from an inner peripheral side.

Since the structure of layers of the base material 200K in the recording surface side is a well-known for the DVD-R, an illustration is omitted. Further, the structure of the optical disk 200 shown in FIG. 2 is schematic and the dimensional ratio of each layer and each area does not necessarily correspond to that shown in the drawing.

The protecting layer 201 is made of a transparent material such as poly-carbonate to transmit the laser beam.

The information recording layer 202 is a layer whose track composed of a plurality of pits is formed on the poly-carbonate base plate and on which the information of the label surface is recorded. Specifically, code information showing a producing maker, the name of a coloring matter used in the discoloring layer 204, the presence or absence of the reflection preventing process in the image forming area 214, the detailed information of the reflection preventing process (the form of a mat process or the quality of a coating material, etc.), the information of a start position and an end position of the image forming area 214, the presence or absence of the servo adjusting area and the information of a start position and an end position of the servo adjusting area are recorded. Further, the optical disk 200 is the DVD-R, however, to prevent another optical disk device from reading the information of the information recording layer 202 and erroneously operating, the track is formed by a plurality of pits on the information recording layer 202 like a CD-ROM, and information is recorded on this track by using a sub-coding format of a CD. Further, the information (the information about the label surface) different from the contents of the information used for sub-coding is recorded. Accordingly, the optical disk device other than the optical disk image forming device 10 cannot read the information recorded in the information area 212.

The reflection preventing layer 203 is a layer in which the reflection preventing process for preventing the reflection of light on the label surface of the optical disk 200 is applied to the poly-carbonate base plate. As the reflection preventing process, a process for forming micro irregularities on the poly-carbonate base plate or a process for coating the poly-carbonate base plate with a reflection preventing material is exemplified. The form of the micro irregularities is changed or the material of the reflection preventing material is changed to change the reflection factor of the light. To the reflection preventing process, for instance, a technique disclosed in the Patent Document 3 or the Patent Document 6 can be applied.

The discoloring layer 204 includes an organic coloring matter different from that of a recording layer that is not shown in the drawing and is provided in the base material 200K so that a clear image with a sharp brightness can be formed. The organic coloring matter is discolored by a laser beam of a weaker power than that of the coloring matter used in the recording layer of the data recording surface not shown and the degree of change of a reflection factor thereof is larger.

The reflecting layer 205 is made of metal such as aluminum to reflect the laser beam.

The adhesive layer 206 is a layer for allowing the base material 200R of the label surface side to adhere to the base material 200K of the data recording surface side.

The information area 212 includes the information recording layer 202 in the entire area thereof, and, as described above, the information of the presence or absence of the reflection preventing process in the image forming area 214 formed on the label surface of the optical disk 200, the kind of the reflection preventing process, the kind of the coloring matter used in the discoloring layer of the optical disk or the like are recorded. It is only in the information area 212 that the track is formed in the base material 200R of the optical disk 200. The track is not formed in other areas. Though the optical disk 200 is the DVD-R, the pits are formed on the track provided in the information recording layer 202 in the same size as that used in the CD and data (information) is recorded in a data format used in the CD. Accordingly, the information recorded in the information area 212 cannot be read by an ordinary optical disk device.

The servo adjusting area 213 is an area for applying the laser beam of the laser power by which the discoloring layer is not changed when the optical disk image forming device 10 forms the image in the image forming area 214 and measuring a quantity of returning light to adjust a laser power and a focus gain. The servo adjusting area 213 may not be necessarily provided. For instance, when the image forming area 214 is desired to be even slightly widened, the servo adjusting area 213 may not be provided. In this case, the laser power and the focus gain may be adjusted in the information area 212.

The image forming area 214 including the reflection preventing layer 203 in the entire area or a part thereof for forming the image by the optical disk image forming device 10.

In FIG. 2, an example is shown in which the reflection preventing layer 203 is provided between the protecting layer 201 and the discoloring layer 204. However, the reflection preventing layer 203 may be provided on the surface of the protecting layer 201 in place of the above. In this case, the power of the laser beam applied to the discoloring layer or the quantity of the returning light of the laser beam applied to the discoloring layer are different from those when the reflection preventing layer 203 is provided between the protecting layer 201 and the discoloring layer 204.

<Correction of Laser Power and Focus Gain>

In the optical disk image forming device 10, to form the image with a sharp brightness and a good visibility on the label surface to which the reflection preventing process is applied or the data recording surface, a plurality of correction parameters for correcting the laser power and the focus gain depending on the reflection preventing process applied to the image forming area of the optical disk are previously stored in the ROM 171 of the control part 170 as described above.

Figure 3:
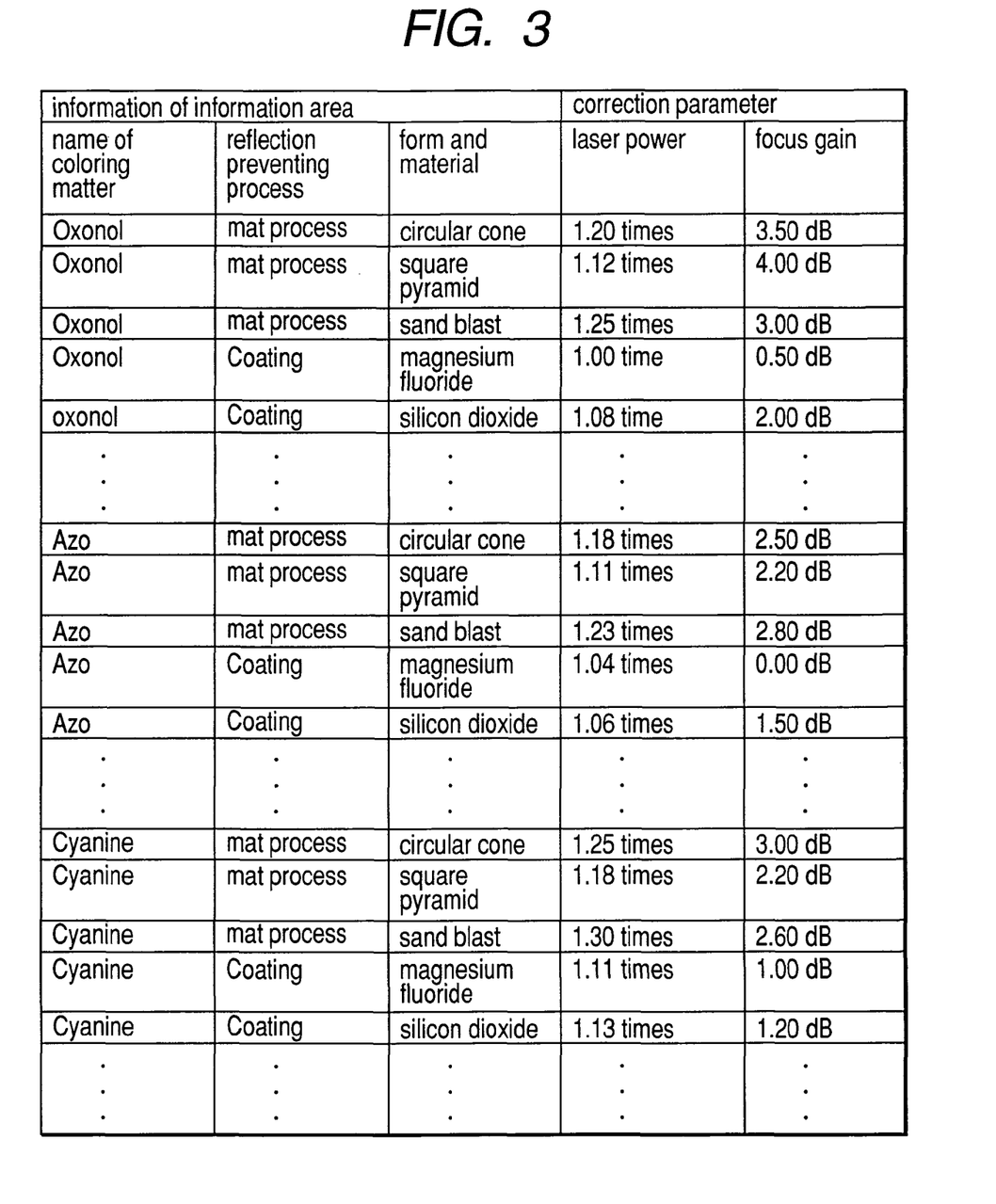
FIG. 3 shows a table of adjusting values of correction parameters for correcting a laser power and a focus gain.

FIG. 3 shows a table of the adjusting values of the correction parameters for correcting the laser power and the focus gain. In FIG. 3, one example of the correction parameters stored in the ROM 171 is shown.

The quantity of the returning light of the laser beam applied to the discoloring layer to form the image on the optical disk has different values between when the reflection preventing process is applied to the image forming area 214 formed on the label surface and when the reflection preventing process is not applied. Further, the above-described laser power or the quantity of the returning light is different between a case that the reflection preventing layer 203 to which the reflection preventing process is applied is provided between the protecting layer 201 and the discoloring layer 204 and a case that the reflection preventing layer 203 is provided on the surface of the protecting layer 201. Further, the laser power or the quantity of returning light is different between a case that a process for forming the micro irregularities (refer it to as a mat process, hereinafter) on the reflection preventing layer 203 is carried out as a the reflection preventing process and a case that the reflection preventing layer 203 is coated with the reflection preventing material. Additionally, the laser power or the quantity of returning light is different depending on the form of the irregularities provided in the mat process or the material of the reflection preventing material. Further, even when the same reflection preventing process is carried out, if the kinds of the coloring matters used in the discoloring layer are different, the laser power or the quantity of the returning light has different values.

Thus, in the optical disk image forming device 10 of the present invention, the table is stored in the ROM 171 that stores the correction parameters for correcting the laser power or the focus gain depending on the contents of the reflection preventing process or the coloring matters used in the discoloring layer.

The values of the laser power or the data of the focus gain are previously obtained from an experiment by the maker of the optical disk image forming device 10 so that the image with the sharp brightness and the best visibility can be formed by the optical disk image forming device 10 and the correction parameters stored in this table are calculated on the basis of these data.

When the image is formed on the optical disk, the control part 170 of the optical disk image forming device 10 reads various kinds of the information such as the presence or absence of the reflection preventing process in the image forming area 214 formed on the label surface of the optical disk 200, the kind of the reflection preventing process, the kind of the coloring matter used in the discoloring layer of the optical disk 200 or the like that are stored in the information area 212 of the optical disk 200. Then, the control part reads the correction parameter of the laser power or the correction parameter of the focus gain meeting the optical disk 200 from the table stored in the ROM 171 on the basis of the information. Then, the optical disk image forming device 10 corrects the value of the laser power or the value of the focus gain in accordance with these values. Specifically, as described below as one example, the control part 170 calculates the product of the laser power or the focus gain adjusted in the servo adjusting area 213 and the correction parameter to correct the value of the laser power or the value of the focus gain to this value.

As well-known, a variation exits in the state of the optical disk depending on a lot, and depending on a time of production even by the same lot. Thus, the optical disk image forming device 10 according to the present invention carries out a process for suppressing the variation before the value of the laser power or the value of the focus gain is corrected. That is, before the value of the laser power or the value of the focus gain is corrected, the optical disk image forming device 10 moves the optical pick-up 100 to a position opposed to the servo adjusting area 213, otherwise, in the case that the servo adjusting area 213 is not provided, to the information area 212, and applies the laser beam to the servo adjusting area 213 or the information area 212 to recognize the quantity of the returning light of the optical disk. Then, the optical disk image forming device determines a reference laser power and a reference focus gain meeting the optical disk on the basis of the value of the quantity of the returning light.

Here, when the laser power or the focus gain is adjusted in the image forming area 214 to which the reflection preventing process is applied, the level of the returning light from the optical disk may be finely varied, especially, may receive no little influence of the fine adjustment of the focus gain so that a proper focus gain cannot be determined. Thus, in the present invention, when the image is formed on the optical disk, the reference value of the laser power or the focus gain meeting the optical disk is determined in the information area 212 or the servo adjusting area 213 to which the reflection preventing process is not applied to correct at least one of the reference value of the laser power or the reference value of the focus gain determined so as to meet the optical disk in accordance with the contents of the reflection preventing process of the optical disk recorded in the information area 212. Thus, the image can be formed on the image forming area 214 with the laser power or the focus gain optimum for the optical disk.

Figure 4:
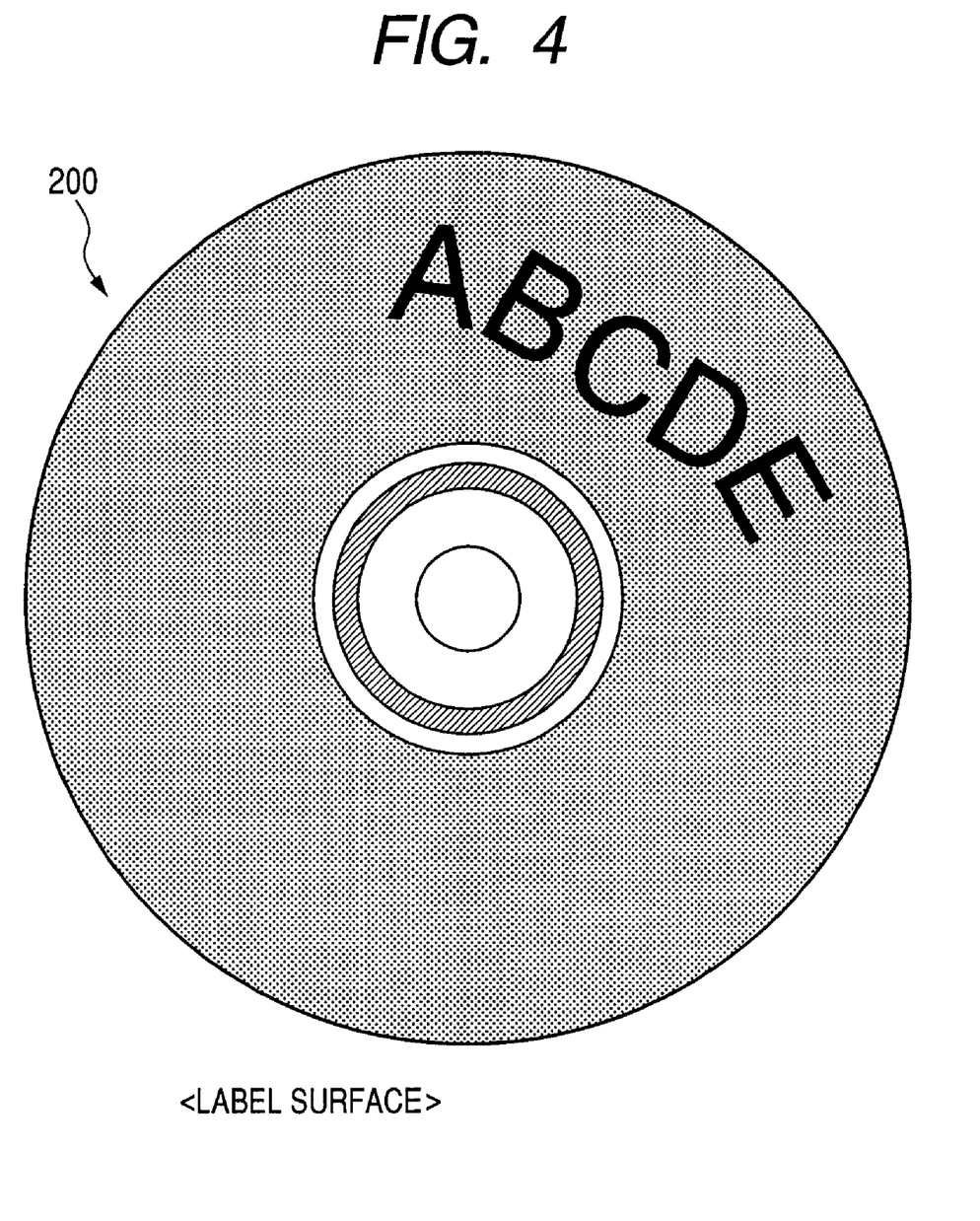
FIG. 4 is a view showing the label surface of the optical disk to which a reflection preventing process is applied.

FIG. 4 is a view showing the label surface of the optical disk to which the reflection preventing process is applied. As described above, the optical disk image forming device 10 of the present invention corrects an variation for each optical disk and sets the proper laser power and the focus gain in accordance with the contents of the reflection preventing process applied to the optical disk. Thus, the image with the best visibility in the optical disk can be formed. Therefore, in the optical disk image forming device according to this embodiment of the present invention, as shown in FIG. 4, the image with the bast visibility can be formed on the optical disk to which the reflection preventing process without causing a rainbow-color to appear or a face or a background to be reflected.

<Image Forming Operation of Optical Disk Image Forming Device>

Figure 5:
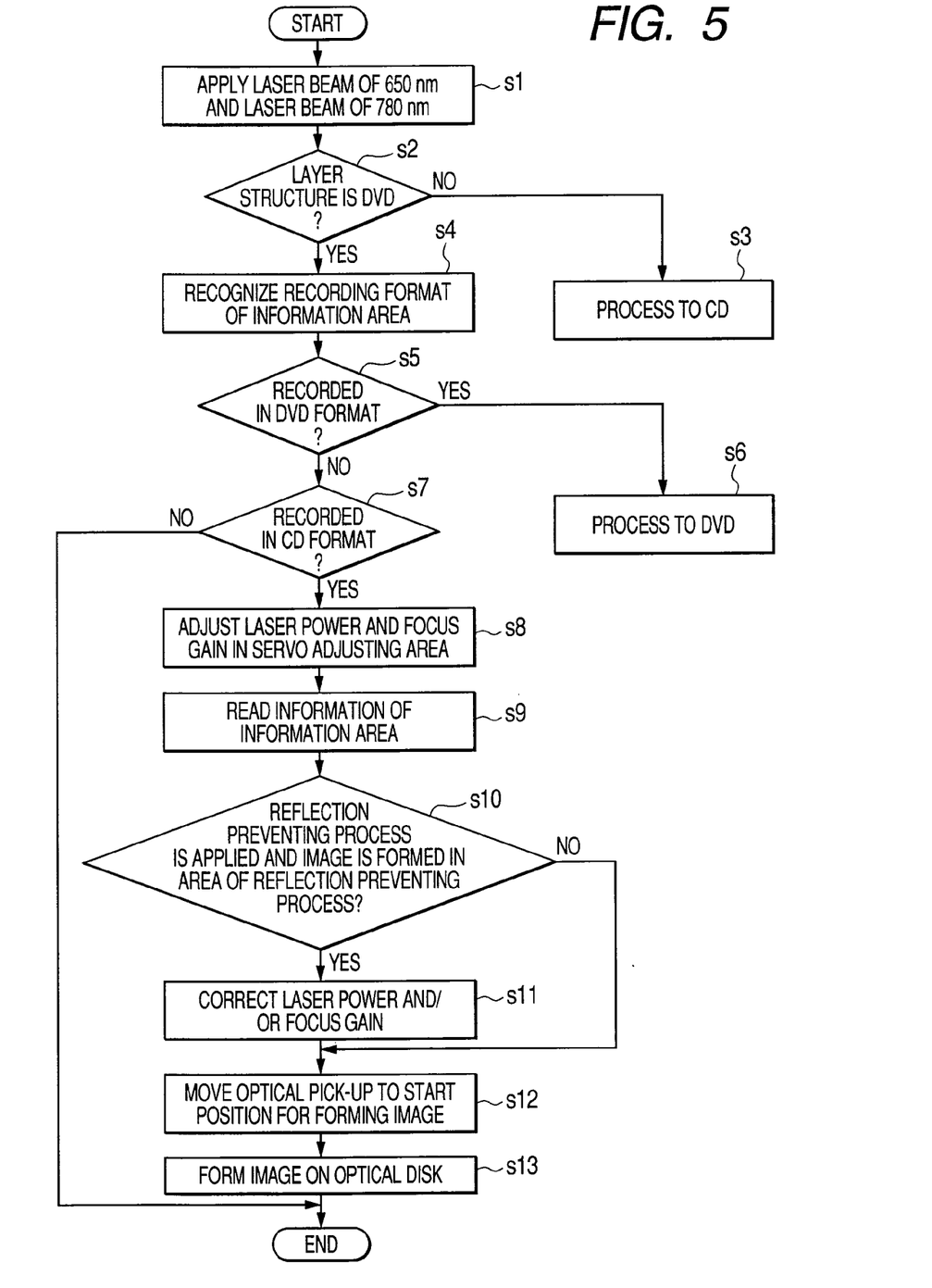
FIG. 5 is a flowchart for explaining an image forming operation of the optical disk image forming device.

Now, an image forming operation of the optical disk image forming device 10 will be described by referring to a flowchart. FIG. 5 is a flowchart for explaining the image forming operation of the optical disk image forming device. Here, the optical disk image forming device 10 forms the image on the label surface of the optical disk 200 by a well-known image forming method. As one example, a case will be described that the image is formed on the optical disk having the discoloring layer provided on the label surface side of the DVD-R.

The control part 170 of the optical disk image forming device 10 outputs a control signal to the servo circuit 138 to allow the spindle motor 130 to rotate the optical disk 200 at a constant angular velocity and outputs a control signal to the ALPC circuit 162 to apply the laser beam of 650 nm and the laser beam of 780 nm to the optical disk 200 from the optical pick-up 100 (s1). Then, the control part recognizes whether or not the layer structure of the optical disk 200 indicates a DVD (s2). When the optical disk 200 does not have the layer structure of the DVD, the control part 170 performs a process to the optical disk of a CD type (s3).

On the other hand, when the optical disk 200 has the layer structure of the DVD, the control part 170 outputs a control signal to the motor driver 142 to move the optical pick-up 100 to a position opposed to the information area 212 by the stepping motor 140. Then, the control part 170 outputs a control signal to the ALPC circuit 162 to apply the laser beam of 650 nm from the laser diode of the optical pick-up 100 not shown in the drawing, and reads information recorded on the information area 212 to recognize a recording format (s4). When the data recorded on the information area 212 is recorded in a DVD format (s5), the control part 170 performs a process to the optical disk of a DVD type (s6). Further, when the information recorded in the information area 212 does not indicate a CD format or when the data is not recorded in the information area 212 (s7), since the optical disk is not an optical disk for forming the image met by the optical disk image forming device 10, processes are finished.

On the other hand, when the data stored in the information area 212 has the CD format (s7), since the optical disk is met by the optical disk image forming device 10 of the present invention, the control part 170 outputs a control signal to the motor driver 142 to move the optical pick-up 100 to a position opposed to the servo adjusting area 213 by the stepping motor 140 and adjust to the laser power and the focus gain (a reference laser power and a reference focus gain) meeting the optical disk (s8) Then, the control part 170 outputs a control signal to the motor driver 142 to move the optical pick-up 100 to a position opposed to the information area 212 by the stepping motor 140 and decodes the information recorded in the information area 212 by the decoder 136 to read the information such as the presence or absence of the reflection preventing process in the image forming area 214 formed on the label surface of the optical disk 200, the kind of the reflection preventing process, the kind of the coloring matter used in the discoloring layer of the optical disk 200 or the like (s9). When the reflection preventing process is applied to the image forming area 214 and the image is formed in the area to which the reflection preventing process is applied (s10), the control part 170 reads from the table stored in the ROM 171 the information such as the kind of the reflection preventing process, the kind of the coloring matter used in the discoloring layer of the optical disk 200 or the like. Then, the control part 170 corrects at least one of the laser power or the focus gain on the basis of the correction parameter (s11). Specifically, the control part 170 carries out a calculation by the laser power or the focus gain adjusted in the step s8 and the correction parameter to correct the laser power or the focus gain to this value. As shown in FIG. 4, for instance, when oxonol is used in the discoloring layer of the optical disk 200 and the mat process having square pyramid shaped irregularities is performed, the control part 170 multiplies the laser power adjusted in the step s8 by 1.12, and increases the focus gain adjusted in the step s8 by 4.00 dB.

Subsequently, the control part 170 outputs a control signal to the motor driver 142 to move the optical pick-up 100 to a position opposed to a start point of forming the image in the image forming area 214 by the stepping motor 140 (s12) to rotate the optical disk at a constant angular velocity, apply the laser beam to the optical disk, carry out a focus servo and form the image corresponding to image data transmitted from the host computer 300 while the spot diameter of the laser beam is maintained to a prescribed value (s13). When the image corresponding to the image data sent from the host computer 300 is completely formed, the control part 170 finishes the processes.

On the other hand, in the step s10, when the reflection preventing process is not applied to the image forming area 214 or when the image is formed in the area of the image forming area 214 to which the reflection preventing process is not applied, the control part 170 outputs a control signal to the motor driver 142 to carry out the processes of the steps s12 and s13 without changing the values of the laser power or the focus gain adjusted in the step s8. Then, when the image corresponding to the image data sent from the host computer 300 is completely formed, the control part 170 finishes the processes.

<Another Structure of Optical Disk and Operation of Optical Disk Image Forming Device >

The optical disk image forming device 10 can form the image on optical disks having below-described structures as well as the optical disk 200 having the structure described with reference to FIG. 2. Namely, the optical disk image forming device 10 can form an image on an optical disk 221 having a group (a guide groove) formed in an information area 212 (an information recording layer 202), an optical disk 222 having groups formed in an information area 212 and a servo adjusting area 213 and an optical disk 223 having a track formed with a plurality of pits in an information area 212 and a groups formed in a servo adjusting area 213. Since the optical disks 221 to 223 have substantially the same structure as that of the optical disk 200 shown in FIG. 2, the illustration of the optical disks 221 to 223 is omitted.

In the information areas 212 (the information recording layers 202) of the optical disks 221 and 222, groups are formed in place of the track composed of the plurality of pits, as on the data recording surface of a DVD-R/RW or a DVD+R/RW in the case of the (DVD-R/RW) of an LPP (Land Pre-Pit) system or the (DVD+R/RW) of an ADIP (Address in Pre-Groove) system. Then, in these grooves, the same address information as that of the DVD-R/RW or the DVD+R/RW is present and disk physical information having different contents (information about a label surface) is recorded in the same format. Further, in the servo adjusting areas 213 of the optical disks 222 and 223, address information and information about a label surface are recorded in the same form as that of the information area 212 of the optical disk 221. As described above, since the information about the label surface is recorded with the contents of the information different from those of the data recording surface of the DVD-R/RW or the DVD+R/RW, even when the information recorded on the information area 212 is read, the contents thereof cannot be decoded by other optical disk device than the optical disk image forming device 10.

When the optical disk image forming device 10 forms the image on the optical disk 221 or the optical disk 222, the optical disk image forming device reads the information recorded in the LPP system or the ADIP system on the information area 212 to form the image corresponding to the presence or absence of the reflection preventing process in an image forming area 214.

Further, when the optical disk image forming device forms the image on the optical disk 223, the optical disk image forming device reads the information of the information area 212 as in the case of the optical disk 200 to form the image corresponding to the presence or absence of the reflection preventing process in an image forming area 214.

Further, when the optical disk image forming device 10 forms the image on the optical disk 200 or the optical disk 221, the device applies to the servo adjusting area 213 the laser beam of the laser power by which the discoloring layer 204 is not discolored to adjust at least one of the laser power or the focus gain. On the other hand, when the optical disk image forming device 10 forms the image on the optical disk 222 or 223, the optical disk image forming device may apply a tracking process to the servo adjusting area 213 and apply the laser beam of the laser power by which a discoloring layer 204 is discolored, that is, a trial write is performed like an OPC to adjust at least one of the laser power or the focus gain. The trial write is carried out in such a way to adjust the laser power or the focus gain, so that the image can be formed in the image forming area of the optical disk with a good visibility having clear light and shade irrespective of the variation of the optical disk.

Further, on the data recording surface of the optical disk, for instance, when the reflection preventing process is applied from an intermediate part to an outer peripheral side in the radial direction, information such as the names of coloring matters used in the recording layer of the data recording surface side, the kind of the reflection preventing process, the start position and the end position of the reflection preventing process or the like is recorded on the optical disk in addition to address information recorded on the optical disk in the LPP system or the ADIP system. When the optical disk image forming device 10 forms the image on the data recording surface of the optical disk, the device reads these information to perform processes respectively like in the case of forming the image on the label surface side. Thus, the optical disk image forming device can form the image on the area of the data recording surface of the optical disk to which the reflection preventing process is applied.

A case that the image is formed on the optical disk in which the reflection preventing process is applied to the entire part of the image forming area of the label surface side is described above, however, the present invention is not limited thereto. It is to be understood that the image can be formed on an optical disk in which the reflection preventing process is applied to a part of the image forming area.

The invention claimed is:

1. An optical disk image forming device for forming an image on an optical disk which includes a data surface and a label surface and in which an information area and an image forming area are set, the optical image forming device comprising:

a laser beam applying unit that performs a focus servo and applies a laser beam to the optical disk;

an information reading unit that drives the laser beam applying unit and reads information from the information area;

a discriminating unit that discriminates whether or not a reflection preventing process is applied to the image forming area in accordance with the read information; and a correcting unit that corrects at least one of a laser power and a focus gain in accordance with information about the image forming area including information about the reflection preventing process when the discriminating unit discriminates that the reflection preventing process is applied to the image forming area, wherein when the image is formed on the image forming area to which the reflection preventing process is applied, the laser beam applying unit applies the laser beam to the optical disk in accordance with at least one of the laser power and the focus gain corrected by the correcting unit to form the image on the image forming area.

2. The optical disk image forming device according to claim 1, wherein the laser beam applying unit applies, before the image is formed, the laser beam to a servo adjusting area or the information area which is set in the optical disk and to which the reflection preventing process is not applied to adjust the laser power and the focus gain.

3. The optical disk image forming device according to claim 1 further comprising a storing unit that stores correction parameters of the laser power and the focus gain corresponding to the reflection preventing process, wherein the correcting unit corrects at least one of the laser power or the focus gain by using the correction parameters read from the storing unit.

4. The optical disk image forming device according to claim 1, wherein the laser power of the laser beam applied when the image is formed on the image forming area to which the reflection preventing process is applied is stronger than the laser power of the laser beam applied when the information is read from the information area.

5. A method of forming an image on an optical disk which includes a data surface and a label surface, and in which an information area and an image forming area are set, the method comprising:

performing a focus servo and applying a laser beam to the optical disk to read information from the information area;

discriminating whether or not a reflection preventing process is applied to the image forming area in accordance with the read information; and correcting at least one of a laser power and a focus gain in accordance with information about the image forming area including information about the reflection preventing process when it is discriminated that the reflection preventing process is applied to the image forming area; and an image forming step of applying the laser beam to the disk in accordance with at least one of the corrected laser power and the corrected focus gain to form the image on the image forming area to which the reflection preventing process is applied.

6. The method according to claim 5 further comprising applying, before the image is formed, the laser beam to a servo adjusting area or the information area which is set in the optical disk and to which the reflection preventing process is not applied to adjust the laser power and the focus gain.

7. The method according to claim 5 further comprising storing correction parameters of the laser power and the focus gain corresponding to the reflection preventing process, wherein, at least one of the laser power or the focus gain is corrected by using the correction parameters stored in the storing step.

8. The method according to claim 5, wherein the laser power of the laser beam for forming the image is stronger than the laser power of the laser beam for reading the information from the information area.

* * * * *